United States Patent
Driscoll et al.

(10) Patent No.: US 10,378,408 B1
(45) Date of Patent: Aug. 13, 2019

(54) AMMONIA GENERATION AND STORAGE SYSTEMS AND METHODS

(71) Applicant: Caterpillar Inc., Peoria, IL (US)

(72) Inventors: James J. Driscoll, Dunlap, IL (US); Eric L. Schroeder, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/935,422

(22) Filed: Mar. 26, 2018

(51) Int. Cl.
*F01N 3/20* (2006.01)
*B01D 53/94* (2006.01)

(52) U.S. Cl.
CPC ....... *F01N 3/2073* (2013.01); *B01D 53/9418* (2013.01); *F01N 3/208* (2013.01); *B01D 53/9495* (2013.01); *B01D 2255/911* (2013.01); *F01N 2610/02* (2013.01); *F01N 2610/1406* (2013.01)

(58) Field of Classification Search
CPC ............ B01D 53/9409; B01D 53/9413; B01D 53/9418; B01D 53/9422; B01D 53/9431; B01D 2257/404; B01D 2258/012; F01N 3/0814; F01N 3/0842; F01N 3/2066; F01N 3/2073; F01N 3/208; F01N 9/00; F01N 2240/25; F01N 2390/00; F01N 2570/14
See application file for complete search history.

(56) References Cited

U.S. PATENT DOCUMENTS

| | | | |
|---|---|---|---|
| 6,176,079 B1 * | 1/2001 | Konrad | F01N 3/0814 60/274 |
| 9,435,242 B2 * | 9/2016 | Kopp | F01N 3/0814 |
| 9,662,611 B2 | 5/2017 | Wan et al. | |
| 2005/0129601 A1 * | 6/2005 | Li | B01D 53/9418 423/239.2 |
| 2007/0048195 A1 * | 3/2007 | Robel | B01D 53/9431 422/168 |
| 2007/0074504 A1 * | 4/2007 | Driscoll | F01N 3/2073 60/285 |
| 2007/0092426 A1 * | 4/2007 | Driscoll | B01D 53/90 423/352 |
| 2008/0295494 A1 * | 12/2008 | Driscoll | F01N 3/2073 60/286 |

(Continued)

*Primary Examiner* — Timothy C Vanoy
(74) *Attorney, Agent, or Firm* — Schwegman, Lundberg & Woessner (57) ABSTRACT

Described herein are illustrative exhaust systems and methods including ammonia generation and storage. An illustrative system can include a first exhaust conduit to and receive a first exhaust stream from a first engine, and a second exhaust conduit to and receive a second exhaust stream from a second engine. In the illustrative example, an exhaust treatment device coupled to the second exhaust conduit downstream of the second engine can convert nitrogen oxides ($NO_x$) in the second exhaust stream into ammonia. An ammonia storage device coupled to the second exhaust conduit downstream of the exhaust treatment device can be configured to receive and store at least a portion of the converted ammonia as stored ammonia and to release at least a portion of the stored ammonia to a catalytic converter. The catalytic converter can include a selective catalytic reduction catalyst configured to use the ammonia to reduce $NO_x$.

20 Claims, 4 Drawing Sheets (56) References Cited

U.S. PATENT DOCUMENTS

| | | | |
|---|---|---|---|
| 2011/0173950 A1* | 7/2011 | Wan .................. | B01D 53/9418 60/274 |
| 2011/0277450 A1* | 11/2011 | Hoyer .................. | F01N 3/0814 60/274 |
| 2012/0042639 A1* | 2/2012 | Montgomery ..... | B01D 53/9409 60/297 |
| 2014/0373509 A1 | 12/2014 | Englert et al. | |
| 2016/0230632 A1 | 8/2016 | Smith et al. | |
| 2016/0298516 A1 | 10/2016 | Tomita et al. | |
| 2016/0356198 A1 | 12/2016 | Dementhon | |

* cited by examiner

AMMONIA GENERATION AND STORAGE SYSTEMS AND METHODS

TECHNICAL FIELD

This document pertains generally, but not by way of limitation, to exhaust systems and methods that reduce nitrogen oxides ($NO_x$) produced by an engine. In particular, the systems and methods described herein may include on-board ammonia generation and storage. The systems and methods may be included in exhaust systems for gas engines, including but not limited to, diesel engines.

BACKGROUND

Exhaust systems for engines can help control the amount of pollution produced by the engine. One form of exhaust treatment can include a catalytic converter having a selective catalytic reduction catalyst. Selective catalytic reduction (SCR) is a process that can be used to control nitrogen oxide ($NO_x$) emissions. SCR is a way of converting $NO_x$ into diatomic nitrogen ($N_2$) and water ($H_2O$) in a catalytic converter, with the help of an ammonia-based reductant and a catalyst.

Ammonia-based $NO_x$ reduction can include using urea (($NH_2$)$_2$Co), or another ammonia-based reductant. Urea can be provided in the form of a second fluid such as diesel exhaust fluid, or DEF. Diesel exhaust fluid may include an aqueous urea solution made with, for example, a 32.5% urea and 67.5% deionized water.

While urea SCR works, the exhaust systems and methods that rely on urea, place a burden on the user. The user must purchase urea (e.g. diesel exhaust fluid) and carry it in a tank onboard the vehicle. When the diesel exhaust fluid runs out, the SCR system will no longer work properly. If the user does not fill the tank with diesel exhaust fluid, the beneficial effects of the SCR system may be degraded or eliminated. Another downside of using a compound including urea is that it freezes at about 12 degrees Fahrenheit, so it may require heated storage, especially in colder climates.

While urea does present some issues for the user, urea can successfully reduce $NO_x$ emissions. When urea is injected into the exhaust stream during the SCR process, the urea is broken down into ammonia ($NH_3$) and carbon dioxide ($CO_2$) in the presence of a catalyst. The ammonia then reacts with the NO to create nitrogen ($N_2$) and water vapor ($H_2O$), which can be less troublesome emissions compared to $NO_x$.

The disclosed systems and method are directed to overcoming one or more of the problems set forth above.

SUMMARY

Illustrative ammonia generation and storage systems and methods, and applications of such systems and methods in exhaust systems are described herein.

In an illustrative ammonia generation and storage system, the system includes a first exhaust conduit configured to be connected to and receive a first exhaust stream from a first engine, and a second exhaust conduit configured to be connected to and receive a second exhaust stream from a second engine. An exhaust treatment device is fluidly coupled to the second exhaust conduit downstream of the second engine and is configured to convert at least a portion of nitrogen oxides in the second exhaust stream into ammonia. At least a portion of the ammonia can be stored in an ammonia storage device that is fluidly coupled to the second exhaust conduit. The ammonia storage device is configured to receive and store at least a portion of the converted ammonia as stored ammonia in a storage material.

Another illustrative example described herein includes an exhaust system. The illustrative exhaust system includes a first exhaust conduit configured to be connected to and receive a first exhaust stream from a first engine, and a second exhaust conduit configured to be connected to and receive a second exhaust stream from a second engine. An exhaust treatment device is fluidly coupled to the second exhaust conduit downstream of the second engine and is configured to convert at least a portion of nitrogen oxides in the second exhaust stream into ammonia. The ammonia can be stored in an ammonia storage device that is fluidly coupled to the second exhaust conduit downstream of the exhaust treatment device. The ammonia storage device is configured to receive and store at least a portion of the converted ammonia as stored ammonia and to release at least a portion of the stored ammonia into at least one of the first exhaust stream and the second exhaust stream. A catalytic converter having a selective catalytic reduction catalyst is fluidly coupled to the first exhaust conduit downstream of the first engine and to the second exhaust conduit downstream of the exhaust treatment device to reduce nitrogen oxides in an exhaust stream.

Another illustrative example described herein includes a method of reducing nitrogen oxides in exhaust. In the illustrative method, the method includes receiving into a first exhaust conduit, a first exhaust stream including first nitrogen oxides from a first engine, and receiving into a second conduit, a second exhaust stream including second nitrogen oxides from a second engine. The illustrative method includes directing at least a portion of the second exhaust stream through an exhaust treatment device. Using the second exhaust stream, the method can include generating ammonia by converting at least a portion of second nitrogen oxides in the second exhaust stream into ammonia. After the ammonia is generated, the method can further include storing at least a portion of the ammonia by directing at least a portion of the generated ammonia into an ammonia storage device. The ammonia storage device can include a storage material. The illustrative method includes releasing at least a portion of the stored ammonia from the storage material, and directing the released ammonia to a catalytic converter to reduce the first nitrogen oxides in the first exhaust stream.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Nitrogen oxides ($NO_x$) present in exhaust from internal combustion engines can be undesirable for the environment.

Therefore, there is a desire to reduce $NO_x$ emissions. As discussed above, selective catalytic reduction (SCR) using an ammonia-based reductant such as urea can reduce $NO_x$ in exhaust. However, the systems and methods that rely on urea, place a burden on the user. The user has to purchase urea (e.g., in the form of diesel exhaust fluid, or DEF) and carry it in a tank onboard the vehicle.

In a chemical reaction, the urea is broken down into ammonia ($NH_3$, the reductant that is actually desired) and carbon dioxide ($CO_2$). The ammonia can then be used in a process of selective catalytic reduction to reduce $NO_x$. In an exhaust system including SCR, if the user allows the urea to run out and the ammonia is not available, the $NO_x$ in the exhaust can increase. In this case, the benefits of SCR can be lost.

Instead of providing urea as the reductant and breaking it down into ammonia, the exhaust systems described herein can use ammonia directly. However, while diesel exhaust fluid containing urea is widely available, there is a lack of infrastructure for the replacement and re-charging of ammonia. The lack of infrastructure makes it difficult to implement an ammonia-based system because it is difficult for users to re-fill (e.g., re-charge) the ammonia.

To overcome the lack of availability of ammonia, and to do so without the significant infrastructure that is currently required in a urea-based exhaust system, the illustrative exhaust systems and methods can include ammonia generation and storage (e.g., on-board ammonia generation and storage). The generated and stored ammonia can be used to reduce $NO_x$ in the exhaust in an SCR process without the worry of running out of ammonia. Generating and storing ammonia, for example in the exhaust system, eliminates the current need to re-fill a tank with urea.

As described herein, the term fluidly coupled can be defined as the fluid contents of two or more components being in fluid communication with each other. In other words, fluidly coupled can include a mechanical coupling that allows communication of fluids, including gaseous substances and particulate matter, within and between components. For example, the contents (or a portion of the contents) of a first component, can be "in fluid communication" with the contents (or a portion of the contents) of a second component.

Figure 1:
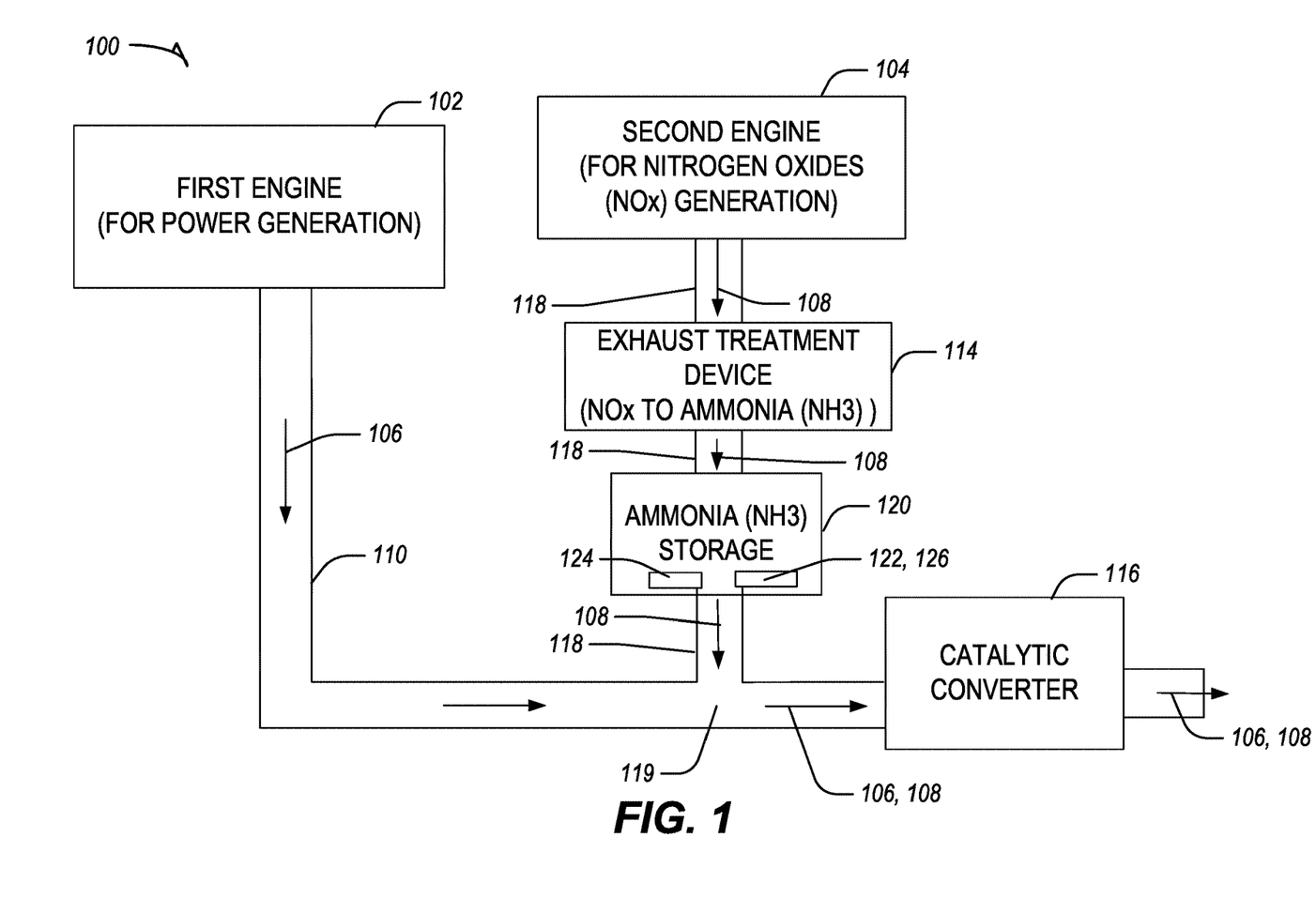
FIG. 1 shows an illustrative exhaust system diagram, in accordance with at least one example.

FIG. 1 shows an illustrative exhaust system 100. The illustrative exhaust system 100 can provide on-board ammonia generation and storage for nitrogen oxide ($NO_x$) reduction. The exhaust system 100 can generate, store and release ammonia in a controlled manner to reduce $NO_x$ in exhaust.

As shown in FIG. 1, the exhaust system 100 can include or be used with a first engine 102 and a second engine 104. In the illustrative example, the first engine 102 can be configured to provide power generation and the second engine 104 can be configured to generate $NO_x$. However, the first engine 102 may also produce $NO_x$.

In an example where the exhaust system 100 is coupled to a vehicle, the first engine 102 may provide motive power to the vehicle and the second engine 104 may not provide motive power to the vehicle. In other examples, either of the first engine 102 or the second engine 104 may provide motive power or may not provide motive power.

While two engines (e.g., 102, 104) are described in the example, other engine arrangements may be provided, including a single engine that acts as two engines, or more than two engines. In an embodiment where the single engine can act as the first engine 102 and the second engine 104 the embodiment can include grouping a first set of cylinders as the first engine 102, and grouping a second set of cylinders as the second engine 104. This can be accomplished, for example, using an exhaust manifold arrangement that diverts the flow from individual cylinders into two separate exhaust streams.

Returning to the example of FIG. 1, the first engine 102 can produce a first exhaust stream 106. The second engine 104 can produce a second exhaust stream 108. In some examples, the first exhaust stream 106 can be a lean exhaust stream, and the second exhaust stream 108 can be a rich exhaust stream. In other words, the first engine 102 can be run "leaner", e.g., at a higher air-to-fuel ratio, than the second engine 104.

In this example, the first engine 102 can generate less $NO_x$ than the second engine 104. The second engine 104, which can be run "richer", e.g., at a lower air-to-fuel ratio, can generate more $NO_x$. The exhaust system 100 described herein can reduce the $NO_x$ produced by one or both the first engine 102 (e.g., first nitrogen oxides) and second engine 104 (e.g., second nitrogen oxides).

In an example, to reduce $NO_x$ produced by the first engine 102, the exhaust system 100 can include a first exhaust conduit 110 configured to be connected to and receive the first exhaust stream 106 from the first engine 102. The exhaust system 100 can treat the first exhaust stream 106 with ammonia and selective catalytic reduction, thereby converting $NO_x$ in the first exhaust stream 106 into water and nitrogen products.

As described above, current practice is to store urea in a tank in the form of diesel exhaust fluid. The urea is then broken down into ammonia that is added to the first exhaust stream 106. The $NO_x$ in the first exhaust stream 106 is converted by the addition of the ammonia and use of selective catalytic reduction, to be converted into less concerning chemicals.

In the present disclosure, ammonia can be generated and stored (e.g., re-charged within the exhaust system 100, on-board a vehicle, or on-board a power generation system). This can reduce or eliminate the need for the user to re-fill a tank with urea and overcomes problems with the lack of readily available infrastructure for ammonia generation and storage.

Instead of re-filling a tank with urea, to provide the exhaust system 100 with a constant source of ammonia, the ammonia can be generated and stored within the exhaust system 100.

In an example, ammonia can be generated from $NO_x$ produced by the second engine 104 through reaction with hydrogen, water and carbon monoxide ($H_2$, $H_2O$, and $CO$) present in rich exhaust gas, and then the ammonia can be used to reduce $NO_x$ produced by the first engine 102. While generating $NO_x$ to reduce $NO_x$, the same chemical, seems counter-intuitive, $NO_x$ can actually be used to reduce itself. The $NO_x$ can be beneficially created (e.g., with a second engine) to be converted into ammonia (e.g., generated ammonia). The generated ammonia can be supplied, along with exhaust containing $NO_x$ (e.g., from the first engine 102) to a catalytic converter 116, including selective catalytic reduction. The result can be a reduction in overall $NO_x$ emissions.

The conversion of NO into ammonia can be performed using an exhaust treatment device 114 (e.g., an ammonia catalyst, a converter that acts as a catalyst to convert $NO_x$ to ammonia).

To generate ammonia, a second exhaust conduit 118 can be configured to be connected to and receive the second exhaust stream 108 (rich in $NO_x$) from the second engine 104. In an example, the second exhaust stream 108 can include $NO_x$ in a higher concentration than is present in the first exhaust stream 106. In other examples, other $NO_x$ ratios between the first and second engines 102, 104 may be provided.

To convert the $NO_x$ in the second exhaust stream 108 into ammonia (to generate ammonia), an exhaust treatment device 114 can be fluidly coupled to the second exhaust conduit 118 to receive the $NO_x$ in the second exhaust stream 108. The exhaust treatment device 114 can be configured to convert at least a portion of $NO_x$ in the second exhaust stream 108 into ammonia.

Although the exhaust treatment device 114 can generate ammonia from $NO_x$, one of the challenges with such an ammonia generation system is that the amount of ammonia generated by the second engine 104 at any given time has to be closely and constantly monitored and controlled to match the $NO_x$ output of the first engine 102. If the amount of ammonia produced is too high it will cause ammonia slip. Ammonia slip occurs when excess unused ammonia passes through the catalytic converter in a larger amount than can be used to convert $NO_x$. Ammonia slip leads to degraded exhaust system performance (e.g., more ammonia). At the other end of the spectrum, if the amount of ammonia delivered to the catalytic converter 116 is too low, some $NO_x$ will pass through the catalytic converter 116 without being converted, also resulting in degraded exhaust system performance (e.g., more $NO_x$).

The present disclosure overcomes issues with constantly generating and changing the amount of ammonia produced. In addition to having the exhaust treatment device 114 configured to generate ammonia by converting $NO_x$ into ammonia, the exhaust system 100 can also beneficially include an ammonia storage device 120 configured to store ammonia in a storage material 122.

One benefit of being able to generate and store ammonia (e.g., on-board a vehicle), is that while diesel exhaust fluid containing urea is widely available, there is a lack of infrastructure for the replacement and re-charging of ammonia. Another benefit is that the timing of ammonia generation in the exhaust system 100 becomes less critical, as will be described herein.

As shown in the illustrative exhaust system 100 of FIG. 1, the ammonia storage device 120 can be fluidly coupled to the second exhaust conduit 118 downstream of the exhaust treatment device 114. The ammonia storage device 120 can be configured to receive and store at least a portion of the generated ammonia (e.g., converted ammonia) as stored ammonia.

In the example of FIG. 1, the second exhaust stream 108 can pass through the ammonia storage device 120. The ammonia storage device 120 can be configured to release at least a portion of the stored ammonia. The released ammonia can be used to treat at least a portion of at least one of the first exhaust stream 106 and the second exhaust stream 108, or another exhaust stream.

In the example, at least a portion of the stored ammonia can be picked up by the second exhaust stream 108 passing through the ammonia storage device 120. The stored ammonia and the second exhaust stream 108 can be combined with the first exhaust stream 106 and directed through a catalytic converter 116 that includes a selective catalytic reduction catalyst configured to reduce $NO_x$.

FIG. 1 merely shows one example flow of exhaust. In various examples, any of the generated, stored and released ammonia can be mixed with at least one of the first and second exhaust streams 106, 108 in any of the first exhaust conduit 110, the second exhaust conduit 118, within a joining portion 119, or can be introduced (e.g., directly or indirectly) into the catalytic converter 116, or through any other conduit or component.

A benefit of generating and storing ammonia is that it enables the exhaust system 100 to "recharge" itself. Generating ammonia within the exhaust system 100 eliminates the need for the user to refill a tank with an ammonia-based reductant (e.g., diesel exhaust fluid including urea). This can be especially useful on-board a vehicle or in a power generation system.

In an example ammonia storage device 120, the ammonia storage device 120 can include a storage material 122 that is configured to store ammonia. To control the amount of ammonia stored in the storage material 122, various aspects can be controlled, such a temperature of the storage material 122, or a pressure in the exhaust system 100 proximate (e.g., local to) the storage material 122. In some examples, the temperature or pressure measured can be measured within the ammonia storage device 120, or within other structures, such as within the second exhaust conduit 118.

In an example, the storage material 122 can include a salt 126 configured to store ammonia. Suitable salts can include, but are not limited to: magnesium chloride, calcium chloride, strontium chloride, magnesium ammine chloride, calcium ammine chloride or strontium ammine chloride, and combinations thereof.

Ammonia storage in the salt 126 (or another storage material) can be encouraged by decreasing a temperature of the salt 126. Ammonia release from the salt 126 can be activated by increasing the temperature of the salt 126. In other words, heating and cooling the salt 126 can affect the amount of ammonia that can be stored or can be released by the salt 126 (e.g., the storage capacity of the salt).

In an example, magnesium chloride or magnesium ammine chloride can be used because magnesium chloride and magnesium ammine chloride have higher decomposition temperatures (e.g., 142° C.) than some other salts. In some examples, the storage material 122 can include other compounds and chemicals besides salt.

Because the temperature of the salt 126 (or other storage material 122) can affect the storage and release of ammonia, to store and release ammonia received from the exhaust treatment system 100, the storage material 122 can be heated or cooled. In some examples, temperature ranges suitable for storing ammonia in the salt 126 can be between 25° C. and 200° C. To achieve the desired temperature, a heating and/or cooling system 124 can provide any method of heat transfer, including conductive, convective, or radiant heat transfer, and combinations thereof.

To increase the capacity of the storage material 122 to store ammonia by absorption, in some examples, the storage material 122 can be cooled. In some examples, the storage material 122 can be cooled by removing heat using a coolant system or fan (e.g., 124) to carry heat away from the storage material 122.

In contrast to cooling the storage material 122 to increase the storage of ammonia, increasing the temperature of the storage material 122 can be used as the physical mechanism that causes ammonia release. For example, to release ammonia, the storage material 122 can be heated by an electrical or fluid heating system (e.g., 124). In an example electrical heating system, a current can be sent through a heating element to generate heat. In an example of a fluid heating system, exhaust or coolant can be used routed through the storage material 122 to change the temperature of the storage material 122.

Instead of, or in addition to heating or cooling the storage material 122, another way to affect the storage and release of ammonia received from the exhaust treatment device 114 is to control the local ammonia concentration at the ammonia storage device 120 (e.g., proximate or within the storage device 120).

The local ammonia concentration affects the amount of ammonia stored (absorbed) or released (diffused) by the salt 126. The local ammonia concentration at the ammonia storage device 120 can be controlled by controlling the $NO_x$ output of the second engine 104. Controlling the $NO_x$ output of the second engine 104 controls the amount of $NO_x$ going into the exhaust treatment device 114 and consequently the amount of ammonia generated by the exhaust treatment device 114. The amount of ammonia generated affects the concentration of ammonia in the second exhaust stream 108.

During absorption and storage, the ammonia present in a higher concentration in the second exhaust stream 108 can be pushed into the storage material 122 having a lower concentration of ammonia.

During diffusion, the ammonia present in a higher concentration in the storage material can move out of the storage material 122 and into the second exhaust stream 108 having a lower concentration of ammonia.

Ammonia can be stored in the storage material over a range of partial pressures. Partial pressure is the pressure contributed by a particular gas in a gas mixture. The partial pressure is proportional to concentration. Using the ideal gas law, concentration can be calculated from partial pressure, and vice-versa partial pressure can be calculated from concentration. In some examples, ammonia can be stored in the storage material 122 at partial pressures in a range between 100-100000 parts per million (ppm).

In some examples, a total exhaust system pressure can be low, such as in a range between 1-3 bar absolute (e.g., on the order of 103 bar absolute). The total exhaust system pressure that the ammonia can be stored at can be equal to the back pressure in the exhaust system 100 (e.g., the second engine 104, the first engine 102, or the first and second engines 102, 104 together).

As shown in FIG. 1, the catalytic converter 116 can be fluidly coupled to the first exhaust conduit 110 downstream of the first engine 102 and the second exhaust conduit 118 downstream of the second engine 104.

The catalytic converter 116 can treat $NO_x$ from both the first and second exhaust streams 106, 108 as shown in the example of FIG. 1. In some examples, only a portion of at least one of the first and second exhaust streams 106, 108 passes through the catalytic converter 116. Any remaining portions of the first or second exhaust streams 106, 108 that are not directed through the catalytic converter 116 can be routed through other exhaust system components, or directly to atmospheric air.

In the illustrative example, the exhaust treatment device 114, the ammonia storage device 120, and the catalytic converter 116 can be fluidly coupled to each other by the first and second exhaust conduits 110, 118. However, in other examples, other conduit arrangements can be provided without departing from the exhaust treatment, ammonia generation, storage and release aspects described herein.

Figure 2:
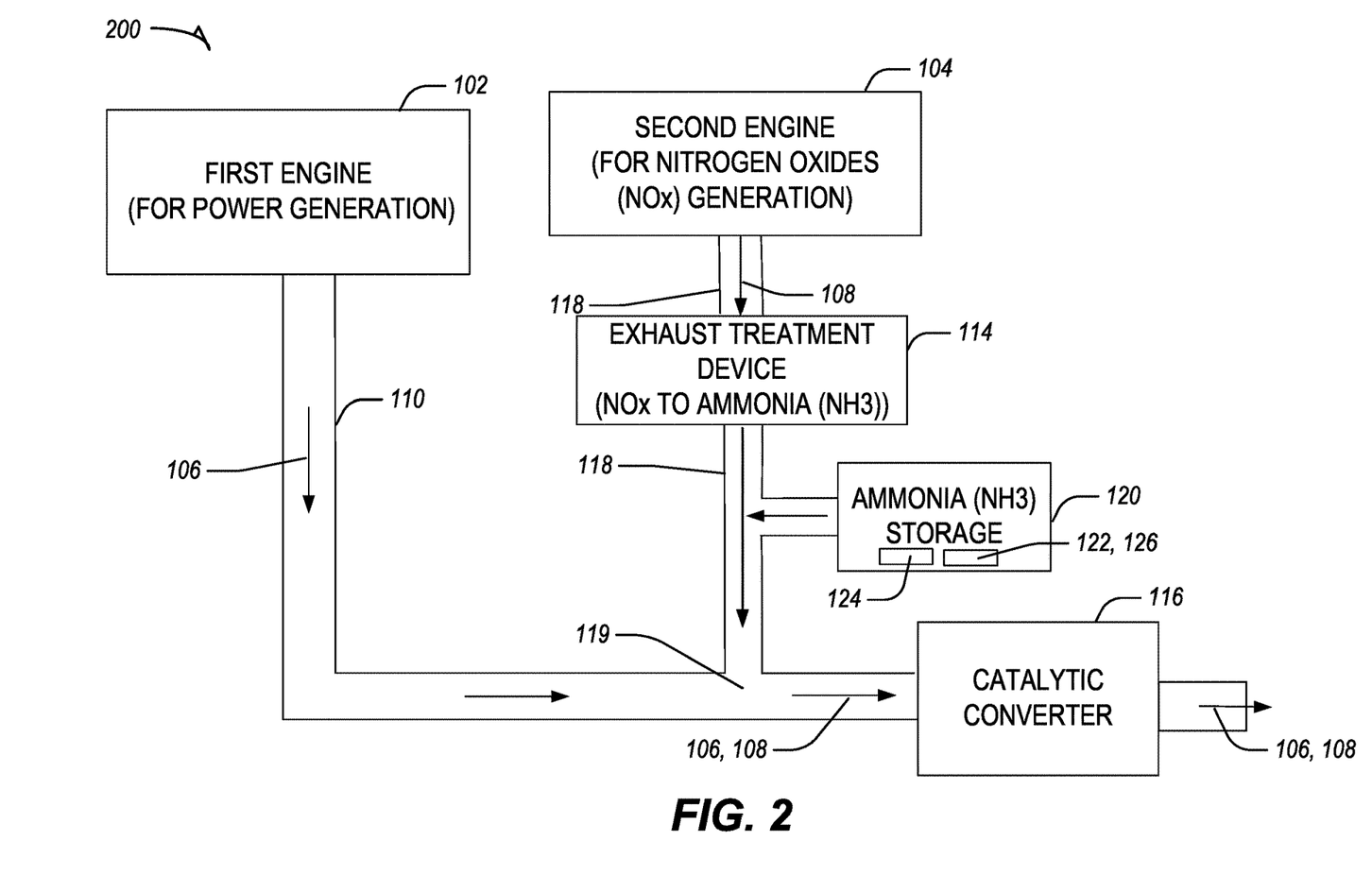
FIG. 2 shows another illustrative exhaust system diagram, in accordance with at least one example.

FIG. 2, shows an exhaust system 200 similar to the exhaust system in FIG. 1, but with an ammonia storage device 120 that may not receive all of the second exhaust stream 108. In FIG. 2 the ammonia storage device 120 is not in-line with the second exhaust stream 108, and therefore may not receive all of the ammonia produced.

The exhaust system 100 in FIG. 1 differs from the exhaust system 200 of FIG. 2 because the exhaust system 100 places the ammonia storage device 120 in-line with the second exhaust stream 108, including the generated ammonia. In this example, ammonia dosing and control can be based on how much ammonia is released from the storage material 122. For example, the second engine 104 output can be reduced or shut off and the storage material 122 can be releasing ammonia.

While similar to the exhaust system 100 of FIG. 1, the exhaust system 200 in FIG. 2, having the ammonia storage device 120 that is not in-line with the second exhaust stream 108, works somewhat differently. In the exhaust system of FIG. 200, the second engine 104 and ammonia catalyst 114 can provide most of the ammonia dosing and control. Here, the ammonia storage device 120 can be used to supplement the ammonia being generated in real time by the second engine 104, as well as during a cold start or transient peak shaving. Transient peak shaving can include brief periods of increased engine-out emissions due to air-fuel ratio control or desire for more rapid response. In this example, the second engine 104 may run at different loads and calibrations to adjust to the transient needs of the exhaust system 200 more than the exhaust system 100 of FIG. 1.

There can be tradeoffs between the exhaust system 100 of FIG. 1 and the exhaust system 200 of FIG. 2. The exhaust system 100 of FIG. 1 can require less engine calibration and operation, while the exhaust system 200 of FIG. 2 can require less storage material 122 and thermal control of the storage material 122.

Figure 3:
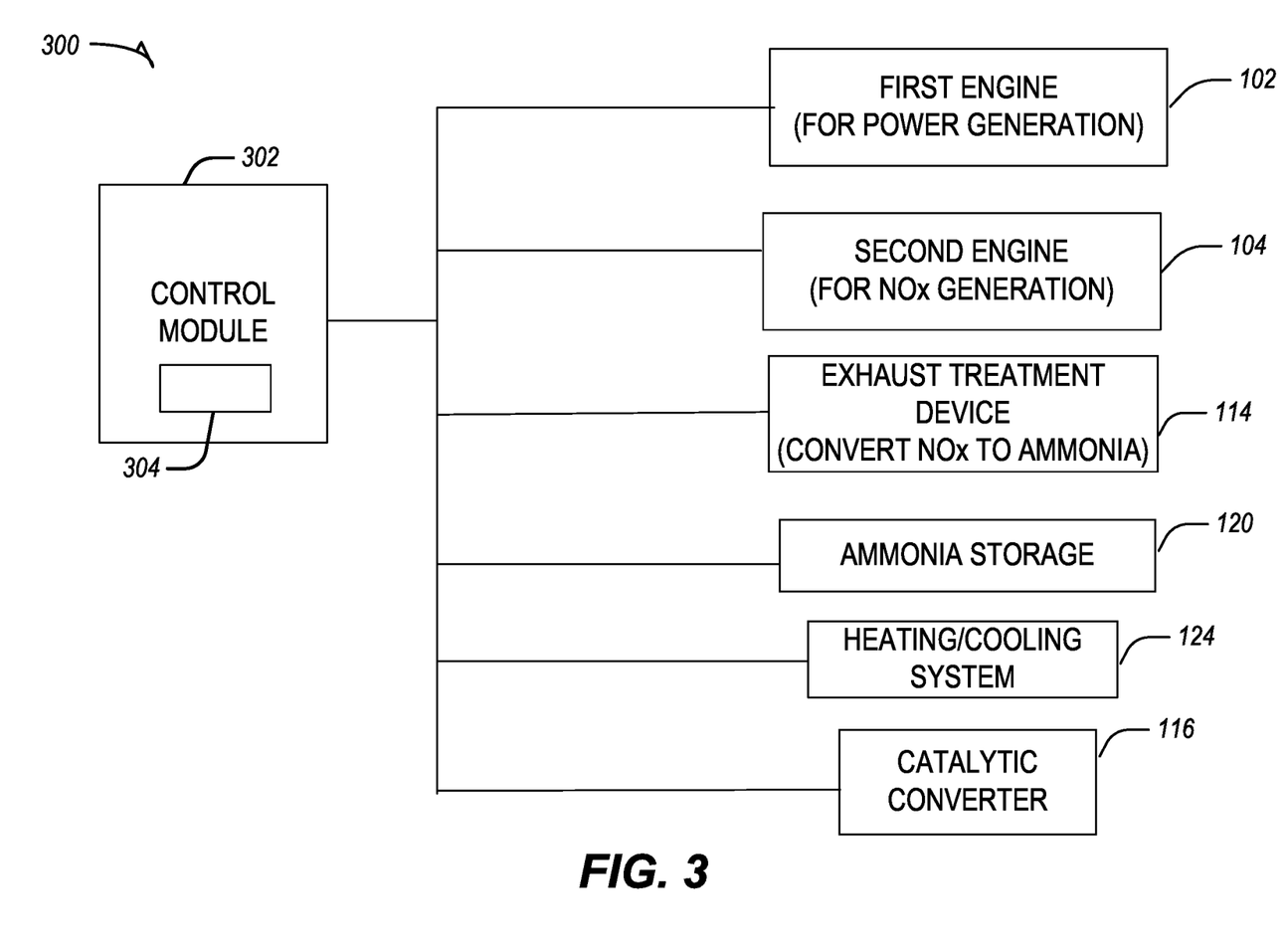
FIG. 3 shows a control system for controlling the exhaust systems of FIGS. 1 and 2, in accordance with at least one example.

FIG. 3 shows an illustrative control system 300 for controlling the exhaust system 100 or 200 or a portion of the exhaust system 100 or 200, in accordance with at least one example.

As shown in FIG. 3, the control system 300 can be operably coupled to any of the first engine 102, the second engine 104, the exhaust treatment device 114, the ammonia storage device 120, a heating and/or cooling system 124, the catalytic converter 116, and any number of monitoring or actuation devices including sensors (e.g., temperature, pressure, concentration, flow rate), valves or injectors, etc. As described herein, operably coupled can include an electrical connection or other means for communicating.

In an example, the control system 300 can include a control module 302 including processing circuitry 304 to control generation, storage and release of the ammonia.

The control system 300 can control the output of the first and second engines 102, 104 including the amount of $NO_x$ produced by the first and second engines 102, 104. The control system 300 can control ammonia generation by controlling the output of the second engine 104.

The control system 300 can control temperature of the storage material 122 in the ammonia storage device 120. The control system 300 can communicate with various sensors to monitor ammonia storage characteristics including any of a temperature sensor, pressure sensor, concentration sensor or flow sensor.

In some examples, the control system 300 can control the amount of ammonia stored and released to the catalytic converter 116 by controlling the temperature of the storage material 122. The storage material 122 temperature can be monitored and adjusted by the control module 302. In some examples the control module 302 can control the storage material 122 temperature based on a target ammonia storage level at a predefined exhaust stream temperature. The control module 302 can receive temperature data from a temperature sensor within or proximate the ammonia storage device 120.

The exhaust stream temperature data used to control the exhaust system 100 or 200 can be a second exhaust stream 108 temperature. However, in some examples, it can be based one or more temperatures measured by one or more temperature sensors at any suitable location in the exhaust system 100 or 200. For example, the exhaust stream temperature can be based on or include a first exhaust stream 106 temperature, the second exhaust stream 108 temperature, an exhaust treatment device 114 temperature, a catalytic converter 116 temperature, an ammonia storage device 120 temperature, or a storage material 122 temperature, or any combination thereof.

The heating and/or cooling system 124 can be operably coupled to the control module 302 to provide heating or cooling of the storage material 122. The heating and/or cooling system 124 can also provide sensor data to the control module 302 including temperature data. The control module 302 can communicate with sensors in any portion of the exhaust system 100 or 200.

The control module 302 can activate release of at least a portion of the stored ammonia at a predefined operating condition. Operating conditions can include, but are not limited to the storage material 122 temperature, the local concentration of ammonia in or being generated and delivered to the ammonia storage device 120, or any type of exhaust temperature or pressure data.

In some examples, by controlling the storage material 122 temperature, the control module 302 can control the release of at least a portion of the stored ammonia from the storage material 122.

In some examples, controlling the amount of ammonia stored or released can be controlled by controlling the output of the second engine 104. For example, by increasing or decreasing the output of the second engine 104, the local ammonia concentration or partial pressure delivered to the ammonia storage device 120 can be correspondingly increased or decreased. In other words, when the control system 300 controls the amount of $NO_x$ produced by the second engine 104, the amount of ammonia generated by the exhaust treatment device 114 can also be controlled. The local ammonia concentration in the second exhaust stream 108 or in the ammonia storage device 120 can affect the amount of stored ammonia released into the exhaust system 100 or 200. For example, a higher concentration of ammonia, or a higher partial pressure in the second exhaust stream 108 can result increased storage capacity of the ammonia storage device 120. Likewise, a lower concentration of ammonia, or a lower partial pressure in the second exhaust stream 108 can result in reduced storage capacity of the ammonia storage device 120, or can allow at least a portion of the stored ammonia to be released.

In some examples, only portions of the exhaust system 100 or 200 may be provided. For example, features of the ammonia generation and storage system can be used separately from the catalytic converter 116.

Figure 4:
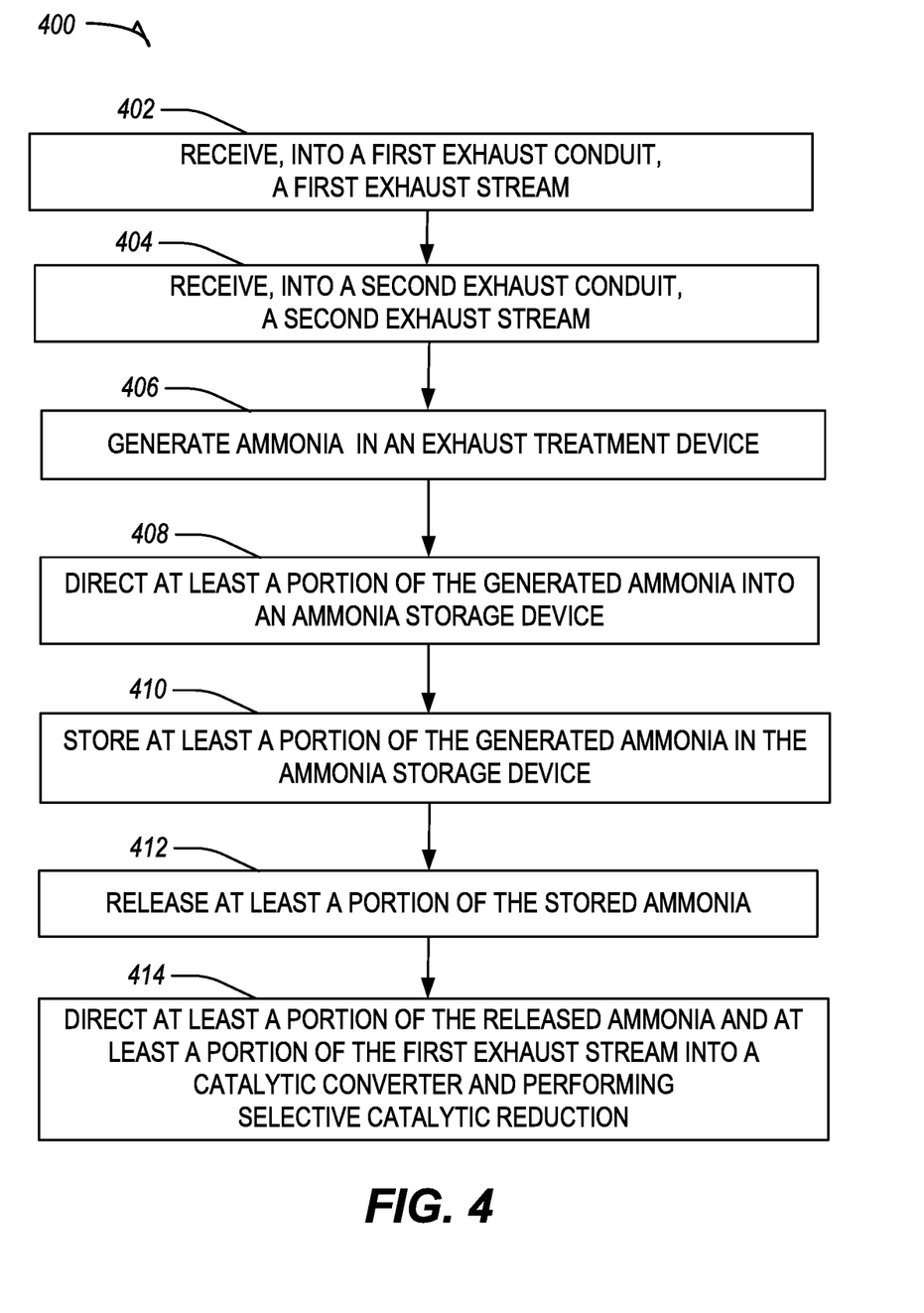
FIG. 4 shows a method of reducing nitrogen oxide ($NO_x$) using the illustrative exhaust systems of FIGS. 1 and 2, in accordance with at least one example.

FIG. 4 shows an illustrative technique 400 of reducing nitrogen oxide ($NO_x$) using the illustrative exhaust systems 100, 200 of FIGS. 1 and 2, in accordance with at least one example.

The technique 400 can be used with the exhaust systems 100, 200 and control system 302 described herein, but can also be used with other exhaust systems, ammonia generation and storage systems and control systems. Alternatively, the exhaust systems, ammonia generation and storage systems and controls systems described herein can also be used with other techniques.

Technique 400 will be described with reference to the exhaust systems 100, 200 of FIGS. 1 and 2, and the control system 300 of FIG. 3. Portions of the technique 400 may be used separately from one another. For example, the ammonia generation and storage features can be used separately from other features of the exhaust system 100, 200 or control system 300.

Any or all of the operations of technique 400 can be used on-board a vehicle (e.g., cars, trucks, recreational vehicles, construction equipment, snowmobiles, boats, ships, etc.). The technique 400 can also be used in other systems having internal combustion engines or other sources that produce $NO_x$, such as power generation systems, including but not limited to, mobile power generation, and tools that include gas internal combustion engines, especially diesel engines.

Operation 402 of the technique 400 can include receiving into a first exhaust conduit 110, a first exhaust stream 106 including first nitrogen oxides (first $NO_x$) from a first engine 102.

Operation 404 can include directing at least a portion of the second exhaust stream 108 through an exhaust treatment device 114.

Operation 406 can include generating ammonia in the exhaust treatment device 114 by converting at least a portion of the second nitrogen oxides (second $NO_x$) in the second exhaust stream 108 into ammonia. In some examples, operation 406 can occur on-board a vehicle. As described herein, one benefit of generating ammonia on-board a vehicle is that it can reduce or eliminates the need for a user to refill an ammonia or other ammonia-based reductant tank on-board the vehicle.

Operation 408 can include directing at least a portion of the generated ammonia into an ammonia storage device 120 including a storage material 122. In some examples, the storage material 122 may include a salt 126 (e.g., salt, a salt compound, pure salt, mostly salt, or salt mixed with other materials).

Operation 410 can include storing at least a portion of the generated ammonia in the ammonia storage device 120. In operation 410, the ammonia can be stored in the storage material 122. In some examples, a portion of the ammonia can also be stored as gas such as in voids between pieces of storage material 122 or in voids in the microstructure of the storage material 122.

Operation 412 can include releasing at least a portion of the stored ammonia from the storage material 122. Operation 412 can be caused by changing the temperature of the storage material 122 by heating or cooling the storage material 122. In operation 412, releasing ammonia (e.g., activating the storage material 122) can include heating or cooling the storage material 122. In some examples releasing a portion of the stored ammonia can include activating the storage material 122 to release at least a portion of the stored ammonia at a pre-defined storage material 122 temperature. In some examples, activating can be caused by heating the storage material 122.

Operation 414 can include directing the ammonia released in operation 412 to a catalytic converter 116 to reduce the first nitrogen oxides (first $NO_x$) in the first exhaust stream 106. In operation 414, the ammonia can be directed to any portion of an exhaust system 100. In some examples, directing the ammonia in operation 414 can include directing the ammonia to or through at least a portion of the first exhaust conduit 110, the second exhaust conduit 118, the first exhaust stream 106, the second exhaust stream 108, a combined first and second exhaust streams 106, 108, a catalytic converter 144, or any other conduit including conduits that recirculate through any portion of the exhaust system 100, 200 or other connected system. Operation 414 can include performing selective catalytic reduction in the catalytic converter 414 to reduce the amount of NO leaving the catalytic converter 114 compared to the amount of $NO_x$ that entered the catalytic converter 114.

In an example, the control system 300 can include a machine readable medium to perform any of the steps of the technique 400. In an example, the term "machine readable medium" can include a single medium or multiple media (e.g., a centralized or distributed database, or associated caches and servers) configured to store one or more instructions.

The term "machine readable medium" can include any medium that is capable of storing, encoding, or carrying instructions for execution by a machine and that cause the machine to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

INDUSTRIAL APPLICABILITY

Nitrogen oxides ($NO_x$) present in exhaust from internal combustion engines can be undesirable for the environment. Therefore, there is a desire to reduce NO emissions. As discussed above, selective catalytic reduction (SCR) using an ammonia-based reductant such as urea can reduce NO in exhaust. However, the systems and methods that rely on urea, place a burden on the user.

An example of industrial applications that use exhaust systems to reduce $NO_x$ include, but are not limited to, vehicles, especially vehicles powered by diesel engines. One problem with some current exhaust systems, including exhaust systems for vehicles, is that the user has to purchase urea (e.g., in the form of diesel exhaust fluid, or DEF) and carry it in a tank onboard the vehicle.

Although urea is the chemical in the diesel exhaust fluid, ammonia is actually the desired reductant. In a chemical reaction, the urea is broken down into ammonia ($NH_3$) and carbon dioxide ($CO_2$). The ammonia can then be used in a process of selective catalytic reduction to reduce $NO_x$. In an exhaust system including SCR, if the user allows the urea to run out and the ammonia is not available, the $NO_x$ in the exhaust can increase. In this case, the benefits of SCR can be lost.

Instead of providing urea as the reductant and breaking it down into ammonia, the exhaust systems described herein can use ammonia directly. However, while diesel exhaust fluid containing urea is widely available, there is a lack of infrastructure for the replacement and re-charging of ammonia. The lack of infrastructure makes it difficult to implement an ammonia-based exhaust system in a vehicle because it is difficult for users to re-fill (e.g., re-charge) the ammonia.

To overcome the lack of availability of ammonia, and to do so without the significant infrastructure that is currently required in a urea-based exhaust system, the illustrative exhaust systems and methods can include ammonia generation and storage (e.g., on-board ammonia generation and storage). The generated and stored ammonia can be used to reduce $NO_x$ in the exhaust in an SCR process without the worry of running out of ammonia. Generating and storing ammonia on-board the vehicle, eliminates the current need to re-fill a tank with urea.

What is claimed is:
1. An exhaust system comprising:
   a first exhaust conduit configured to be connected to and receive a first exhaust stream from a first engine;

a second exhaust conduit configured to be connected to and receive a second exhaust stream from a second engine;

an exhaust treatment device fluidly coupled to the second exhaust conduit downstream of the second engine and configured to convert at least a portion of nitrogen oxides in the second exhaust stream into ammonia;

an ammonia storage device fluidly coupled to the second exhaust conduit downstream of the exhaust treatment device and configured to receive and store at least a portion of the converted ammonia as stored ammonia and to release at least a portion of the stored ammonia into at least one of the first exhaust stream and the second exhaust stream; and a catalytic converter having a selective catalytic reduction catalyst configured to reduce nitrogen oxides in an exhaust stream, the catalytic converter fluidly coupled to the first exhaust conduit downstream of the first engine and to the second exhaust conduit downstream of the exhaust treatment device.

2. The system of claim 1, wherein the ammonia storage device includes a storage material that is configured to store ammonia.

3. The system of claim 2, wherein the storage material is activated to release at least a portion of the stored ammonia at a predefined operating condition.

4. The system of claim 2, wherein the storage material includes a salt, and wherein the salt is activated to release at least a portion of the stored ammonia at a predefined temperature.

5. The system of claim 2, further comprising a control system configured to control the release of at least a portion of the stored ammonia by controlling a temperature of the storage material.

6. The system of claim 1, wherein the exhaust system is coupled to a vehicle.

7. The system of claim 1, wherein the first engine provides motive power to a vehicle and wherein the second engine does not provide motive power to a vehicle.

8. A method of reducing nitrogen oxides in exhaust, the method comprising:

receiving into a first exhaust conduit, a first exhaust stream including first nitrogen oxides from a first engine;

receiving into a second conduit, a second exhaust stream including second nitrogen oxides from a second engine;

directing at least a portion of the second exhaust stream through an exhaust treatment device;

generating ammonia by converting at least a portion of second nitrogen oxides in the second exhaust stream into ammonia;

directing at least a portion of the generated ammonia into an ammonia storage device including a storage material;

storing at least a portion of the generated ammonia in the ammonia storage device;

releasing at least a portion of the stored ammonia from the storage material; and directing the released ammonia to a catalytic converter to reduce the first nitrogen oxides in the first exhaust stream.

9. The method of claim 8, wherein generating the ammonia occurs on-board a vehicle.

10. The method of claim 8, wherein the ammonia storage device includes a storage material configured to store ammonia.

11. The method of claim 10, wherein the storage material includes a salt.

12. The method of claim 11, wherein releasing at least a portion of the stored ammonia includes activating the salt to release at least a portion of the stored ammonia at a predefined salt temperature.

13. The method of claim 11, further comprising controlling heating or cooling of the salt.

14. An ammonia generation and storage system comprising:

a first exhaust conduit configured to be connected to and receive a first exhaust stream from a first engine;

a second exhaust conduit configured to be connected to and receive a second exhaust stream from a second engine;

an exhaust treatment device fluidly coupled to the second exhaust conduit downstream of the second engine and configured to convert at least a portion of nitrogen oxides in the second exhaust stream into ammonia; and an ammonia storage device fluidly coupled to the second exhaust conduit, the ammonia storage device configured to receive and store in a storage material at least a portion of the converted ammonia as stored ammonia.

15. The system of claim 14, further comprising a control system to control release of at least a portion of the stored ammonia.

16. The system of claim 14, wherein the storage material includes a salt, and wherein the salt is activated to release at least a portion of the stored ammonia at a predefined operating condition.

17. The system of claim 16, wherein the predefined operating condition is a temperature of the salt, and wherein the temperature of the salt is controlled by a control system operably coupled to the ammonia storage device.

18. The system of claim 14, wherein the ammonia storage device is configured to release at least a portion of the stored ammonia into at least one of the first exhaust stream and the second exhaust stream or a catalytic converter.

19. The system of claim 18, wherein the catalytic converter has a selective catalytic reduction catalyst (SCR) configured to reduce nitrogen oxides in an exhaust stream, the catalytic converter fluidly coupled to the first exhaust conduit downstream of the first engine and to the second exhaust conduit downstream of the exhaust treatment device.

20. The system of claim 14, wherein the ammonia generation and storage system, the first engine and the second engine are coupled to a vehicle, wherein the first engine provides motive force to the vehicle, and wherein the second engine does not provide motive force to the vehicle.

* * * * *